United States Patent Office 3,050,508
Patented Aug. 21, 1962

3,050,508
PROCESS FOR PREPARING PURE POLYVINYL ALCOHOL
Werner Starck, Hofheim (Taunus), and Karl-Heinz Kahrs, Alfred Kuhlkamp, and Werner Ehmann, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 8, 1959, Ser. No. 858,072
Claims priority, application Germany Dec. 18, 1958
6 Claims. (Cl. 260—91.3)

The present invention relates to a process for the manufacture of pure polyvinyl alcohol by saponifying polyvinyl esters with a strong acid in the presence of water and a solvent of well defined properties.

Polyvinyl alcohol becomes more and more important as starting material for the preparation of shaped structures, films, impregnating agents and fibers and as protective colloid for emulsion and suspension polymerization processes. Numerous experiments have already been made in order to find new and more economical methods for preparing polyvinyl alcohol or to improve known processes. According to many of the known processes polyvinyl alcohol is prepared by re-esterifying polyvinyl esters in an alcohol, for example methanol. This method has the drawback that the esters which form are either of low economical value or their re-formation into acid and alcohols by splitting can be brought about in a complicated way only. It has also been endeavoured to reduce the cost of the preparation of polyvinyl alcohol by using as starting material dispersions of polyvinyl esters which are cheap.

According to the process described in German Patent No. 874,664, for example, polyvinyl alcohol is prepared by saponifying dispersions of polyvinyl esters in the presence of a great excess of a low boiling alcohol, for example methanol, with mineral acid and continuously distilling off the acetic acid methyl ester that forms. In that process there are necessary obtained large quantities of acetic acid methyl ester that cannot be made use of economically to a sufficient extent and besides the polyvinyl alcohol is only obtained in the form of an aqueous solution.

According to German Patent No. 964,443 polyvinyl alcohol is prepared by saponifying a polyvinyl acetate dispersion or an aqueous suspension of bead polymer with mineral acid and extracting the acetic acid by means of an appropriate solvent. In German printed application No. 1,035,899 as laid open to public inspection it has been proposed to carry out the saponification of polyvinyl esters in a mixture of solvent and water which is continuously adapted to the solubility of the polymer by increasing the proportion of water during the saponification. The acetic acid is extracted. By the processes of the aforesaid patent and the printed application aqueous polyvinyl alcohol solutions and acetic acid are obtained.

The difficulties of extracting acetic acid from polyvinyl alcohol solutions are known to all skilled in the art. Even if the mixtures are worked up by the best possible methods a few percentages of acetic acid remain in the solution besides the mineral acid, and have to be neutralized. The salts that form are undesirable for many purposes for which the polyvinyl alcohol is to be used. It is complicated and, due to the necessary recovery of solvent, uneconomical to purify or isolate the solid polyvinyl alcohol by precipitating the aqueous solution, for example with methanol or acetone.

Now we have found that polyvinyl alcohol can be obtained in a pulverulent form with the simultaneous formation of the corresponding organic acid, by saponifying a polyvinyl ester, preferably polyvinyl acetate, with a strong acid in the presence of water and a solvent having the following properties:

(1) Under the reaction conditions the solvent must not form esters with the acid radical of the polyvinyl ester;
(2) The solvent must be a solvent for the polyvinyl ester but a nonsolvent for polyvinyl alcohol;
(3) The solvent must be capable of dissolving water at least in small quantities, it may, however, also be miscible with water in any ratio whatever;
(4) The solvent must not enter into undesired by-reactions with any of the substances participating in the reaction.

As solvents that comply with these requirements there have proved suitable, for example, ketones such as acetone, ethyl-methyl-ketone and diethyl-ketone, the hydrocarbon chains of which may, if desired, be substituted by chemically inactive groups; tertiary alcohols containing at least one hydroxyl group, for example tertiary butanol; esters such as acetic acid methyl ester; or cyclic ethers such as tetrahydrofurane.

Mixtures of these compounds with one another or with other inert solvents, for example aromatic hydrocarbons such as benzene, toluene or xylene, may also be used.

As saponification catalysts there are used inorganic or strong organic acids, for example hydrochloric acid, sulfuric acid, phosphoric acid, perchloric acid, alkyl-sulfonic acid, alkaryl-sulfonic acid or aryl-sulfonic acid. The proportion of acid contained in the reaction mixture amounts in general to 0.01 to 10%, preferably 0.5 to 7% and in special cases to 1 to 2.5%.

The quantity of water used is advantageously within the range of 0.5 to 15%. Particularly good results are obtained by using between 5 and 15% of water. Water may also be added continuously during the saponification. The total quantity of water must, however, in every case be so small that no polyvinyl alcohol solution forms.

The concentration of polyvinyl ester amounts in general to 1 to 50%, preferably 5 to 30%, by weight, calculated on the solvent.

The saponification temperature is within the range of 10° to 120° C., preferably 30° to 95° C., the best result being obtained when operating at a temperature within the range of 65 to 75° C. The application of pressure may be advantageous in special cases.

If it should prove to be expedient the saponification may be carried out in the presence of an inert gas, for example nitrogen, pure $CO_2$ or $CH_4$.

The reaction period is in general within the range of 5 to 35 hours, the preferred duration of the reaction being within the range of 15 to 25 hours.

The process of the invention enables the saponification of polyvinyl esters which are obtained by any kind of polymerization, for example block-, solution-, emulsion- or suspension-polymerization. The acyl radicals of the polyvinyl esters which can be converted into polyvinyl alcohol by the process of the invention are suitably acid radicals containing 1 to 10 carbon atoms.

The polyvinyl alcohol is separated from the saponification mixture by a usual mechanical method, for example by filtering, centrifuging or squeezing off, and it is then washed with a small amount of solvent chosen from the group of solvents suitable for use in the process of the invention, until it is free from acid. After drying, a pulverulent and completely colorless polyvinyl alcohol is obtained. It is easily possible by the process of the invention to prepare polyvinyl alcohols containing less than 1% of residual acyl groups.

The present process offers the great advantage that the polyvinyl alcohol obtained is free from salt. Furthermore the polyvinyl alcohol which is obtained in the form of a powder can, if desired, be washed with cold water without any swelling or gelatinization taking place. When the temperature is increased the polyvinyl alcohol is soluble in water. The solutions thus obtained remain homogeneous even when cooled to room temperature. A higher content of acetyl groups can be adjusted by a premature interruption of the saponification, by the choice of an appropriate mixture of solvents, by the quantity of water used or by the temperature of saponification.

The acid, in particular acetic acid, that is set free by the saponification of the polyvinyl ester can be recovered from the saponification liquor with a high degree of purity by a simple distillation.

The following examples serve to illustrate the invention but they are not intended to limit it thereto.

*Example 1*

100 grams of polyvinyl acetate, for example a bead polymer having a K value of 90 (according to Fikentscher) were dissolved at an elevated temperature in 900 grams of tertiary butanol. The solution was heated to 70° C. A mixture of 20 grams of sulfuric acid and 150 grams of water was added dropwise within 15 to 20 minutes. The solution was then stirred at a temperature of 70° C. After a temporary thickening, the polyvinyl alcohol began to separate after 12 hours. Stirring was continued for 12 to 14 hours at 70° C. The polyvinyl alcohol was then filtered off, washed with a small amount of tertiary butanol and dried. The yield corresponded approximately to the theoretical yield. The content of acetyl groups amounted to 0.8%.

*Example 2*

100 grams of polyvinyl formate having a K value of 30 (according to Fikentscher) were dissolved at an elevated temperature in 900 grams of tertiary butanol. The solution was heated to 70° C. whereupon a mixture of 20 grams of sulfuric acid and 150 grams of water was added dropwise within 15 to 20 minutes. Then the solution was stirred at a temperature of 70° C. After 10 hours the polyvinyl alcohol began to separate. Stirring was continued for 10 hours at 70° C. The polyvinyl alcohol was filtered off, washed with a small amount of tertiary butanol and dried. The yield corresponded approximately to the theoretical yield. The content of formyl groups amounted to 0.7%.

*Example 3*

250 grams of an aqueous dispersion of about 50% strength of polyvinyl acetate were introduced while stirring into 900 grams of tertiary butanol having a temperature of about 50° C. A mixture of about 20 grams of sulfuric acid and 50 grams of water was then added. The resulting mixture was heated to 70° C. while stirring. After a short time a clear solution formed. The subsequent operations of saponification and isolation were carried out in a manner analogous to that described in Example 1. The yield corresponded approximately to the theoretical yield. The polyvinyl alcohol obtained contained about 0.9% of acetyl groups.

*Example 4*

100 grams of polyvinyl propionate having a K value of 50 (according to Fikentscher) were dissolved at an elevated temperature in 800 grams of tertiary butanol. At a temperature of 65° C. a mixture of 20 grams of sulfuric acid and 150 grams of water was added dropwise. The solution was then stirred at an internal temperature of 65° C. After a temporary thickening, the polyvinyl alcohol began to separate after 12 hours. After another 14 hours the polyvinyl alcohol was filtered off, washed with a small amount of tertiary butanol and dried. The yield corresponded approximately to the theoretical yield. The polyvinyl alcohol contained 0.9% of propionyl groups.

*Example 5*

150 grams of polyvinyl acetate having a K value of 80 (according to Fikentscher) were dissolved in 1050 grams of methyl acetate. A mixture of 24 grams of sulfuric acid and 150 grams of water was then added dropwise within 15 minutes while stirring. After a temporary thickening the polyvinyl alcohol began to separate after about 11 hours. After 23 hours the reaction mixture was cooled to room temperature. Subsequently the polyvinyl alcohol was filtered off and washed repeatedly in a suction filter with acetone containing 10% of water. The polyvinyl alcohol was then dried. The yield corresponded approximately to the theoretical yield. The content of acetyl groups amounted to 4.2%.

*Example 6*

100 grams of polyvinyl acetate having a K value of 60 (according to Fikentscher) were dissolved in a mixture of 250 grams of tertiary butanol and 250 grams of methyl acetate. The solution was heated to 75° C. A mixture of 10 grams of sulfuric acid and 75 grams of water was added dropwise while stirring, and the mixture so obtained was maintained at 75° C. After a temporary thickening the polyvinyl alcohol began to separate out after 10 hours. After 16 hours the reaction mixture was cooled to room temperature, the polyvinyl alcohol was filtered off as described above and washed. The yield corresponded approximately to the theoretical yield. The content of acetyl groups amounted to 11.5%.

*Example 7*

100 grams of polyvinyl acetate having a K value of 90 (according to Fikentscher) were dissolved in 900 grams of acetone. The temperature of the solution was increased to 65° C. A mixture of 20 grams of sulfuric acid and 150 grams of water was added dropwise while stirring. Stirring was continued at 65° C. After a temporary thickening the polyvinyl alcohol precipitated after 13 hours. After a total duration of 27 hours the polyvinyl alcohol was filtered off, washed with a small amount of acetone and dried. The yield corresponded approximately to the theoretical yield. The content of acetyl groups amounted to 0.8%.

*Example 8*

The experiment was carried out in the manner described in Example 7 with the exception that 10 instead of 20 grams of sulfuric acid were used as starting material. The duration of the saponification amounted to 36 hours. The yield corresponded approximately to the theoretical yield. The content of acetyl groups amounted to 0.9%.

*Example 9*

100 grams of polyvinyl acetate having a K value of 60 (according to Fikentscher) were dissolved in a mixture of 100 grams of benzene and 400 grams of acetone. The solution was heated to 75° C. A mixture of 7 grams of perchloric acid and 75 grams of water was added dropwise while stirring. Stirring was continued at 75° C. After a temporary thickening the polyvinyl alcohol began to separate out after 14 hours. After a total duration of 27 hours the reaction mixture was cooled to room temperature, the polyvinyl alcohol was filtered off, washed with aqueous acetone in a suction filter and then dried. The yield corresponded approximately to the theoretical yield. The content of acetyl groups amounted to 2.5%.

*Example 10*

300 grams of an aqueous dispersion of about 50% strength of polyvinyl acetate were introduced while stirring into 1000 grams of acetone. A mixture of 20 grams of sulfuric acid and 150 grams of water was added dropwise while stirring. The reaction mixture was then heated to 65° C. Stirring was continued at this temperature and after a short time a clear solution was obtained. After a temporary thickening the polyvinyl alcohol began to separate out after 12 hours. After a total duration of 26 hours the reaction mixture was cooled to room temperature and the polyvinyl alcohol was filtered off, washed with a small amount of aqueous acetone and dried. The yield was almost theoretical. The content of acetyl groups amounted to 0.8%.

*Example 11*

100 grams of polyvinyl acetate having a K value of 90 (according to Fikentscher) were dissolved in a mixture of 200 grams of methyl acetate and 700 grams of acetone. The solution was heated to 65° C. A mixture of 20 grams of sulfuric acid and 150 grams of water was added dropwise while stirring. Stirring was continued at 65° C. After a temporary thickening the polyvinyl alcohol began to separate out after 13 hours. After 25 hours the whole was cooled to room temperature and the polyvinyl alcohol was filtered off, washed in a suction filter and dried. The yield coreresponded approximately to the theoretical yield. The content of acetyl groups amounted to 2.3%.

We claim:

1. A process for the manufacture of polyvinyl alcohol in a powdery filterable form adaptable to washing in cold water without swelling and containing no more than 11.5 percent of unhydrolyzed acyl groups, which process comprises saponifying an ester of polyvinyl alcohol and an aliphatic monocarboxylic acid having 1 to 10 carbon atoms at a temperature in the range between 10° C. and 120° C. in a saponification mixture of 0.1 to 10 percent by weight of at least one strong acid as a saponification catalyst, 0.5 to 15 percent by weight of water, the balance being a mixture of said ester and a water-miscible and acid-miscible solvent which is inert to said carboxylic acid and which is a non-solvent for polyvinyl alcohol, said ester being present as 1 to 50 percent by weight of said solvent in the ester-solvent mixture, whereby polyvinyl alcohol is precipitated in powdery form with the simultaneous formation of free carboxylic acid from the ester saponified.

2. A process as in claim 1 wherein said solvent is tertiary butanol.

3. A process as in claim 1 wherein said solvent is acetone.

4. A process as in claim 1 wherein said solvent is tetrahydrofuran.

5. A process as in claim 1 wherein said strong acid is sulfuric acid.

6. A process as in claim 1 wherein said strong acid is perchloric acid.

References Cited in the file of this patent
UNITED STATES PATENTS

| | | |
|---|---|---|
| 2,360,308 | Thomas et al. | Oct. 10, 1944 |
| 2,569,470 | Hagemeyer et al. | Oct. 2, 1951 |